United States Patent [19]

Yalen

[11] Patent Number: 4,968,257
[45] Date of Patent: Nov. 6, 1990

[54] COMPUTER-BASED TEACHING APPARATUS

[76] Inventor: William J. Yalen, 59 Indigo St., Mystic, Conn. 06355

[21] Appl. No.: 316,173

[22] Filed: Feb. 27, 1989

[51] Int. Cl.$^5$ .............................................. G09G 5/00
[52] U.S. Cl. .................................. 434/308; 434/169; 434/307; 434/323; 273/1 E; 340/709; 364/419
[58] Field of Search ............... 434/118, 159, 167, 169, 434/176, 178, 183, 184, 185, 188, 201, 276, 277, 307, 308, 309, 310, 322, 323, 324, 335, 336, 339, 343, 350, 353, 362, 365, 379, 401, 427, 428, 429, 430, 433; 340/709, 799; 273/148 B, 1 E, 85 G, DIG. 28; 364/419

[56] References Cited

U.S. PATENT DOCUMENTS

| | | |
|---|---|---|
| Re. 32,305 | 12/1986 | Baer . |
| 3,245,157 | 4/1966 | Laviana .......................... 434/336 X |
| 3,728,480 | 4/1973 | Baer . |
| 4,095,785 | 6/1978 | Conner . |
| 4,142,180 | 2/1979 | Burson . |
| 4,305,131 | 12/1981 | Best . |
| 4,333,152 | 6/1982 | Best . |
| 4,352,492 | 10/1982 | Smith ...................... 273/DIG. 28 X |
| 4,490,810 | 12/1984 | Hon ......................... 273/DIG. 28 X |
| 4,519,003 | 5/1985 | Scholz . |
| 4,521,870 | 6/1985 | Babbel et al. ................... 340/709 X |
| 4,560,359 | 12/1985 | Wilson et al. . |
| 4,569,026 | 2/1986 | Best . |
| 4,681,548 | 7/1987 | Lemelson ........................ 434/308 X |
| 4,846,693 | 7/1989 | Baer ................................... 434/308 |

Primary Examiner—Richard J. Apley
Assistant Examiner—Joe H. Cheng
Attorney, Agent, or Firm—Albert W. Hilburger

[57] ABSTRACT

A limited function, user interactive teaching apparatus includes a memory for storing a compilation of words and phrases to be used by the teaching apparatus and a pedagogical lesson database which includes a plurality of substantially identical, limited size, lesson frame data units, each such unit including a plurality of pointers for selecting words and/or phrases to be displayed during the execution of the program unit. Each program unit thus comprises, in the main, pointer data rather than substantive pedagogical data. A display is employed for displaying the selected words and phrases and, in addition, includes a movable indicator cursor or touch sensitive position indicator. A processor executes the pedagogical program, unit by unit. The processor fetches the selected words and/or phrases and provides them to the display in accordance with pointer data contained in each data unit. The apparatus is provided with x-y movement means for causing the cursor to move on the display and, further, to indicate a user's response to an indicated question. A voice synthesizer provides tutorial instruction, operational directions, and informs the user of the outcome of a completed exercise.

10 Claims, 4 Drawing Sheets

FIG. 1.
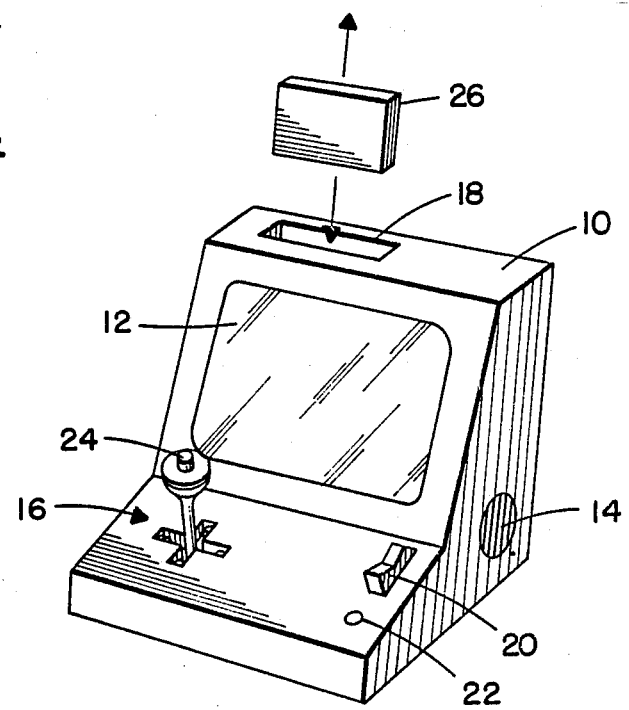
FIG. 1A.
FIG. 1B.
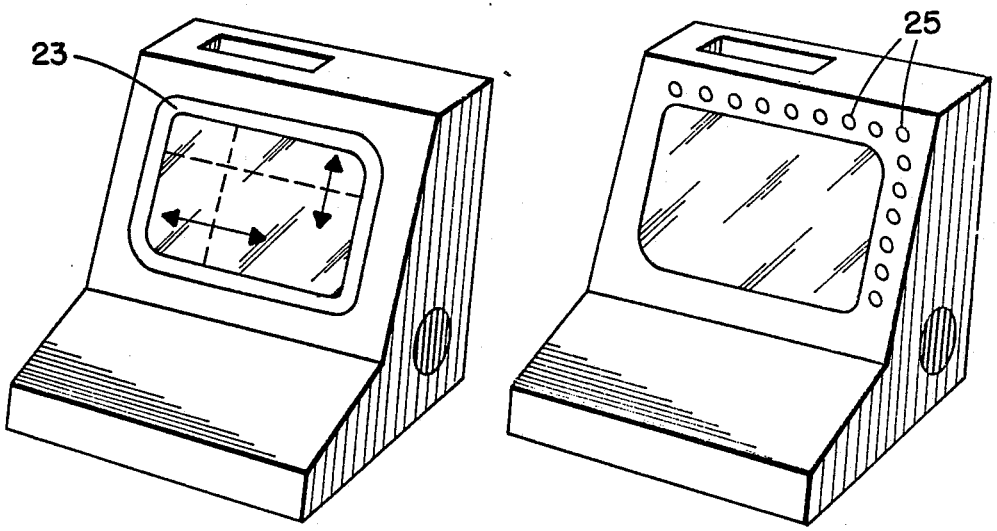

LESSON FRAME FORMAT

DATA FIELDS
- SCREEN DISPLAY LOCATION FOR EACH WORD
- MEMORY DATA POINTER FOR EACH WORD
- MEMORY VOICE POINTER FOR EACH PHONEME STRING
- ROW & COLUMN LIMITS POSITION OF ANSWER
- "BRANCH TO" ADDRESSES (KEYED TO ANSWER)

COMPUTER-BASED TEACHING APPARATUS

FIELD OF THE INVENTION

This invention relates to automated teaching devices, and more particularly to program controlled, user friendly teaching devices particularly adapted to remedial education applications.

BACKGROUND OF THE INVENTION

The art is replete with educational teaching devices of various levels of complexity. Probably the most widely used computer-based teaching device is the personal computer. Thousands of hours of courseware are available for use on such computers, and they find wide application in colleges, high schools and grade schools. Nevertheless, such systems suffer from a number of shortcomings. First, they are expensive, each generally costing on the order of a thousand dollars or more. Second, and probably more important, when they are used for remedial teaching purposes, the students find them difficult to use and intimidating (e.g. they require the reading of text from a display and the entry of inputs through a letter/number oriented keyboard). The requirement to make abstract translations between desired selections and the key or button strokes required for input to make those selections, is a significant obstacle to the unsophisticated user. These factors, cost and difficulty of use, inhibit the use of such systems for remedial applications and for the learning impaired. Certain companies have attempted to overcome these drawbacks by the introduction of toy-like products which perform a limited teaching function. For instance, the Texas Instruments "Speak and Spell" (a Trademark of Texas Instruments) and other similar products are such toys but have limited application to adult remedial education due to a lack of flexibility of lesson structure, the user's inability to modify the internal pedagogical program, limited display capability and, most important, a reliance on an alpha-numeric keyboard or button set for input. At the other extreme are full function, general purpose computers along with various displays and data input and storage devices (e.g. video discs) which are expensive.

Others have suggested for both training and game applications, the use of a television receiver in combination with a simplified input device. In U.S. Pat. Nos. 3,728,480 and Reissue 32,305, R. H. Baer shows the connection of the control unit to a television receiver with the control unit including means for the manipulation and control of video signals to be displayed on the receiver's screen. Individual control units are provided for the game participants. In certain configurations, a commercial television station broadcasts encoded question and answer data which is decoded and displayed on the receiver screen and the user responds thereto via the control unit.

A similar system is found in U.S. Pat. Nos. 4,569,026 and 4,333,152 which both describe an interactive system wherein a user interacts with a video display through the manipulation of a hand held control unit. Other, more complex, teaching systems are also well known in the art and employ a large central computer for control of relatively nonintelligent terminals. One such system is PLATO (a Trademark of the Control Data Corporation) wherein hundreds, if not thousands, of remotely located terminals provide pedagogical software to remotely located users.

All of the above systems suffer from one or more of the following shortcomings: too expensive; intimidating and/or impractical for unsophisticated users; lack of flexibility in providing appropriate pedagogical software to the user; and/or significant training is required before a user is able to interact with the system.

Accordingly, it is an object of this invention to provide low cost, computer-based teaching apparatus which is particularly adapted to remedial applications.

It is a further object of this invention to provide a low cost computer based teaching apparatus which is not intimidating to the unskilled user and avoids the use of a keyboard input.

Another object of the invention is to provide a user friendly interactive teaching apparatus which relates the results of a teaching exercise both visually and audibly.

SUMMARY OF THE INVENTION

A limited function, user interactive teaching apparatus is described which includes memory means for storing a compilation of words and phrases to be used by the teaching apparatus, and a pedagogical data base which includes a plurality of substantially identically formatted, limited size, lesson frame data units, each such unit including a plurality of pointers for selecting words and/or phrases to be displayed during the execution of the data unit. Each data unit thus comprises, in the main, pointer data rather than substantive pedagogical data. A display is employed for displaying the selected words and phrases and, in addition includes a movable indicator cursor. A processor executes the pedagogical program, unit by unit. The processor fetches the selected words and/or phrases and provides them to the display in accordance with pointer data contained in each program unit. The apparatus is provided with x-y movement means for causing the cursor to move on the display and, further, to indicate a user's response to an indicated question. A voice synthesizer provides instruction to the user and informs the user of the outcome of a completed exercise.

DESCRIPTION OF THE DRAWINGS

FIG. 1 is a perspective view of the invention which employs a joy stick a a user input.

FIG. 1(a) is a perspective view of the invention which employs a touch-sensitive user input.

FIG. 1(b) is a perspective view of the invention which employs depressible buttons for user inputs.

DETAILED DESCRIPTION OF THE INVENTION

As will become hereinafter apparent, a number of features combine in this invention to provide a low cost, user friendly, pedagogical teaching apparatus suitable for remedial application. The only user input is a simple position input device, such as a joy stick, which enables movement of a display cursor and has an associated select button for providing simple yes/no inputs to the system. (A touch sensitive display screen or a plurality of selection buttons directly adjacent to the display screen can also be used for the same purpose). An included processor system is, to assure low cost, of limited capability and employs a read only memory which stores the words and/or phrases to be displayed by the system. The software which operates the invention processes a lesson database comprised of lesson data frames which are of identical format, but of variable size with an upper size limit. Each lesson data frame includes, in the main, pointers to words and/or phrases to be used during execution of the frame or to display locations necessary for such execution.

Figure 2:
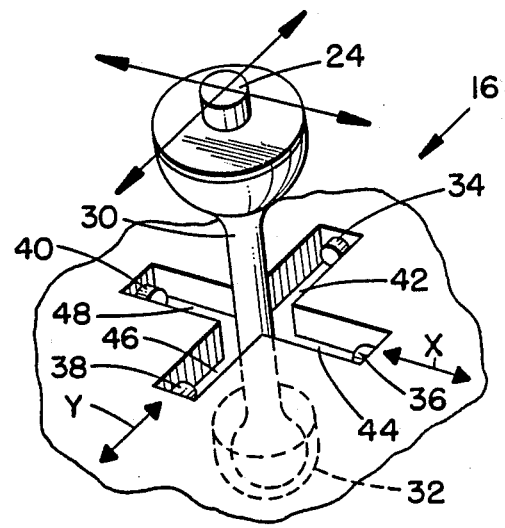
FIG. 2 is a perspective view of a joy stick usable with the invention.

Referring now to FIG. 1, the invention is housed in a small case 10 in which there is included a display 12, speaker 14, input device 16, cartridge receiving slot 18, power switch 20 and indicator light 22. Display 12 is preferably a multiple line, multiple character LCD display which may or may not be backlit, depending upon cost considerations. Speaker 14 provides verbal tutorial instruction, operational directions and feedback responses to the user. Input device 16 is preferably a joystick on which is mounted a select button 24. The details of joystick 16 are shown in FIG. 2. Alternatively, the select button may be located away from, but near to, the joystick.

Joystick 16 comprises a shaft 30 which is movable in socket 32 to engage any of switches 34, 36, 38 and/or 40. Each of the aforementioned switches is mounted at the anterior end of an associated slot (i.e. 42, 44, 46, and 48). When a user moves joystick in either the x or the y direction, shaft 30, at the limit of its deflection, depresses one of the switches and causes an output therefrom to be provided to the system. The operation of select button 24 is described below.

Returning now to FIG. 1, a variety of data input devices may be employed to provide pedagogical software to the system. In this instance, cartridge 26 is shown as providing the input data, with slot 18 providing ingress and egress from a reading mechanism. It is also contemplated that a, plug-in, read only memory (ROM) could be employed as an input means. Whatever input means is employed, it is preferable that it be low cost and self operated by the system—rather than requiring user intervention for program loading (other than through the simple insertion of a cartridge into a receiving slot).

In FIGS. 1(a) and 1(b), alternate user input devices are shown which obviate the need for joy stick 16. In FIG. 1(a), a touch-sensitive bezel 23 is attached to the display screen and provides x, y input data when the user touches the screen at a selected location. In FIG. 1(b), a plurality of depressible buttons 25 are arrayed adjacent to one or more sides of the screen and when depressed, indicate a user's selection of a particular line or column on the screen.

Figure 3:
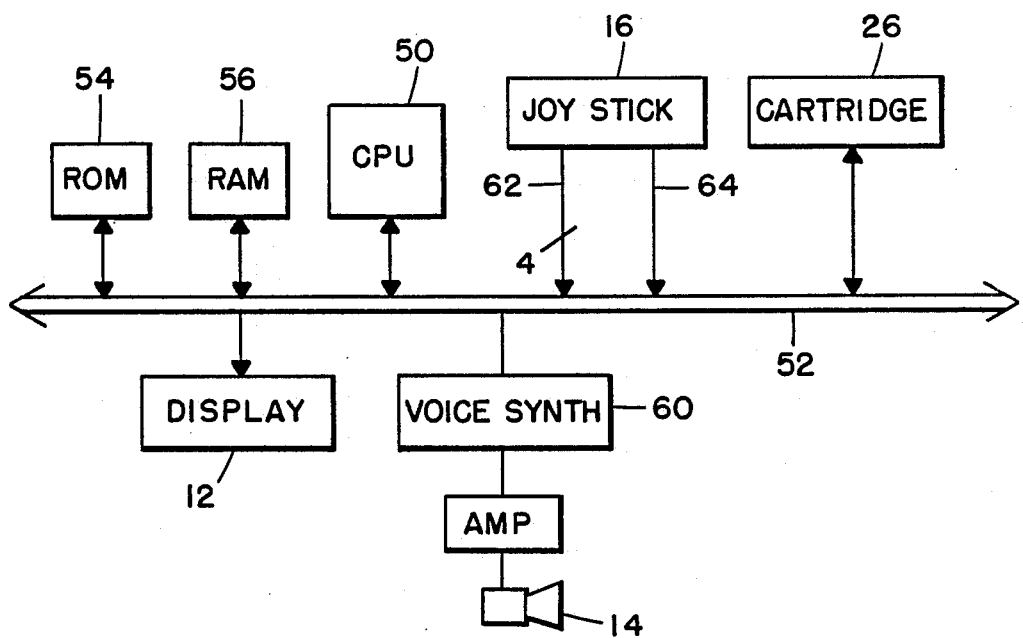
FIG. 3 is a block diagram indicating the main components of the invention.

Referring now to FIG. 3, a block diagram of the circuitry of the invention is shown and comprises a central processing unit 50 (CPU) connected to a bus 52 that, in the well known manner, provides the main data transfer paths between elements of the system. A pair of memories 54 and 56 are connected to bus 52 as well as a voice synthesis circuit 60 and its associated output amplifier and speaker 14. Read only memory (ROM) 54 contains the program, and words and/or phrases to be employed by processor 50 in its operation and display of the pedagogical software. ROM 54 also includes the phoneme strings associated with each word and/or phrase to be provided by voice synthesis circuit 60 during its operation. Random access memory 56 (RAM) provides storage for dynamically changing data necessary for program execution and receives the input software and database when cartridge 26 is inserted and its contents are read into the system (assuming a ROM cartridge is not used). If a ROM cartridge is used, ROM 54 is unnecessary as its function is performed by the cartridge.

Joystick 16, when it is moved by a user and depresses one of switches 34, 36, 38 or 40 provides a cursor movement signal to the system via line 62. If the user depresses select button 24 (FIG. 2), a signal is produced on line 64 which is sensed by CPU 50 to indicate selection of the item located at the current cursor position. If a touch sensitive display surface is used, those actions are combined by touching the screen at the desired location to provide the x-y input data. Similarly, if buttons directly adjacent to the screen are used, the actions are combined by pressing the button adjacent to the desired selection to provide the x and/or y input data.

Figures 4, 5:
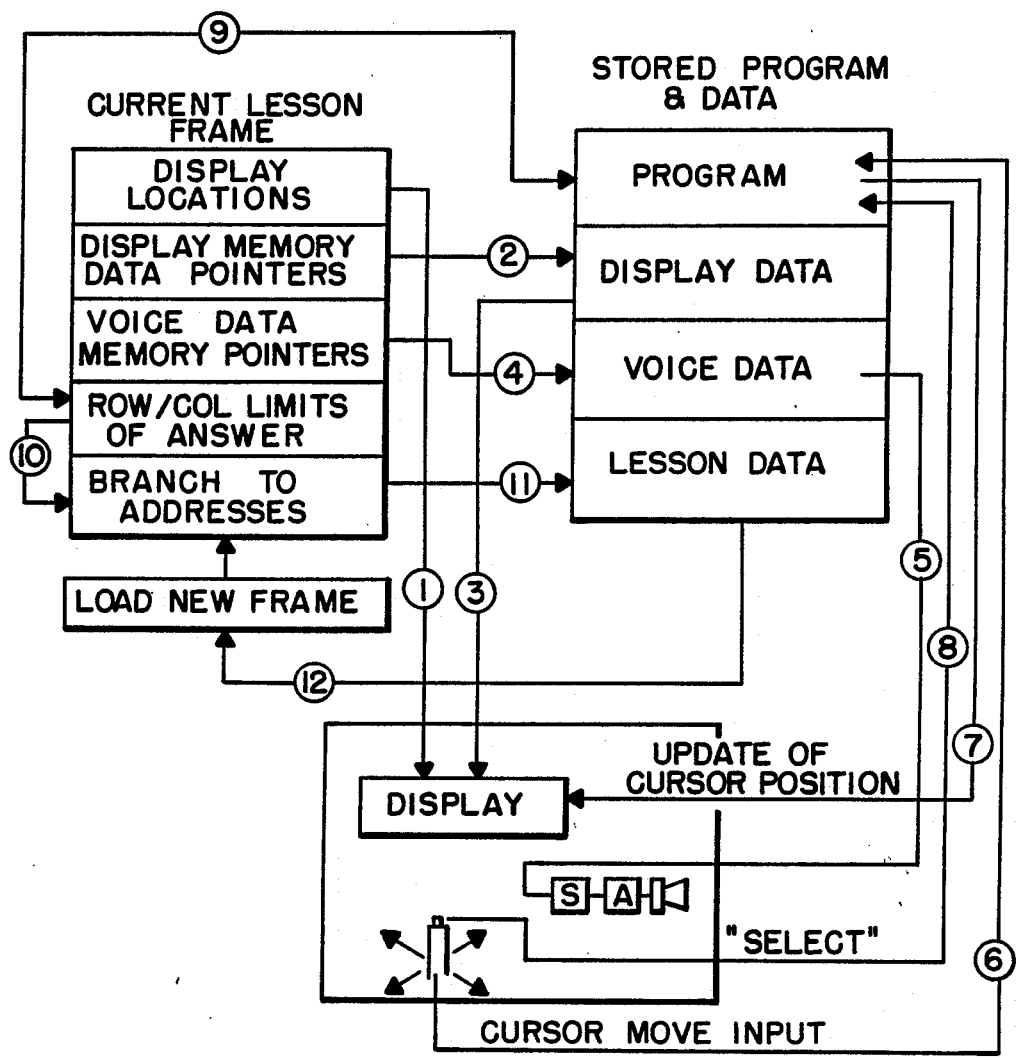
FIG. 4 is the format of each data frame used with the invention.
FIG. 5 is a flow chart indicating the sequence of events which occur when each frame of courseware is executed.

The software stored in ROM 54 or loaded by cartridge 26 into RAM 56, includes a plurality of program units or lesson frames composed of data fields whose format is shown in FIG. 4. Each lesson frame is substantially of identical format and contains a limited amount of data. The amount of data in each field varies within set limits according to specific needs of the frame, and each field boundary is defined by a special code delimiter. By this arrangement, a substantial quantity of lesson data can be inputted from a single cartridge or stored in a single ROM, thus enabling the system to be easily and quickly loaded without requiring the handling of a plurality of cartridges.

The lesson frame format includes display screen locations for each word and/or phrase so that CPU 50 can place each word and/or phrase in its proper location on the display, upon it being accessed from memory. A memory data pointer is included for each word and/or phrase and indicates the address in ROM 54 where the desired word and/or phrase to be used will be found. A memory voice pointer is also provided which indicates the address of each phoneme string in ROM 54 that will be used during the execution of the lesson frame. Row and column limits specify the areas on screen 12 where user positioning of a cursor and simultaneous actuation of select button 24 or the touching of the touch-sensitive screen (if so equipped) or the depressing of a button adjacent the screen (if so equipped) will provide a correct answer. Finally, a series of "branch to" addresses are included which indicate the address of the next lesson frame within ROM 54 or RAM 56 (if loaded from a non-ROM cartridge).

The data items in the lesson, display and voice databases are stored in sequence within the database storage areas. The starting memory address of each item is established as the database is compiled. These addresses are recorded for later use by the programmer. These addresses are what the pointers to memory point to. In operation, the current frame data are loaded into designated portions of RAM 56 where the control program looks for each field, as needed, to execute the frame.

In summary, each lesson data frame provides the complete information needed to structure the data that is to be displayed on screen 12 and output via speaker 14, as well as the data necessary to interpret and respond to a user's input. For instance, display 12 may, in response to the execution of a lesson frame, include a question followed by a plurality of suggested answers, one or more of which is correct and the rest incorrect. The user moves the cursor under the answer he/she believes to be correct and then depresses the select button 24 to indicate the selection to the CPU 50. In response, if CPU 50 determines that the user has depressed select button 24 within the row and column limits for a correct answer, the program branches to the next lesson frame in the instructional sequence. If however, an incorrect answer is inputted, the lesson frame may be retried or a remedial frame selected.

Similarly, for example, display 12 may, in response to the execution of a lesson frame, display text for a reading student to practice reading. If the student desires to have the system pronounce a difficult word or group of words he/she selects that word or group of words (as afore described for selection from amongst a plurality of answer choices) and the system "speaks" the desired text, providing remediation to the student.

Referring now to FIG. 5, the operation of the invention in its execution of a single lesson frame will be described. Initially, when a lesson frame is accessed from ROM 54 or RAM 56, the screen location for the first word to be displayed is passed to the display control circuitry. Next accessed is the corresponding memory data pointer, which points in memory to the starting address of the data item to be displayed. Data in memory starting at that address are passed until the "end of database item delimiter" code is reached. This sequence is repeated for all screen display items in the frame by processing, in turn, each pointer in the display location field of the frame to be displayed, and passing that data to the display.

When an end-of-field delimiter in the display location field is reached, then next, the voice data (phonemes) is accessed and passed in sequence to the voice data synthesizer, to be converted into audible speech by similarly accessing the voice database at the locations indicated by the voice phoneme pointers in the data frame.

At this stage, the display has been configured, the voice data has been converted to audible speech and the user sees on the screen the indicated instructional display, such as a question and/or proposed answers. The user moves the joystick, causing inputs into the program module which, in turn, cause the cursor to move on the face of the screen. When the user depresses the select button, the program determines whether the selection has occurred within the boundaries of an acceptable answer. In order to determine this, the row and column limits which define the correct answer are accessed and the current cursor row and column location is compared with the limits to determine the correctness or incorrectness of the answer. The program then determines which of a plurality of "branch to" addresses should be accessed for the next frame. The appropriate next frame's data is then loaded into the RAM.

The voice data provided by the system may, as each line of data is displayed, provide tutorial instruction, operational direction or indicate to the user an audible statement of the data. It may also respond to the user if either a correct or an incorrect answer is indicated. Furthermore, if an answer is incorrect, it can indicate to the user whether he/she should retry the question or what alternative is to be next undertaken.

Figure 6:
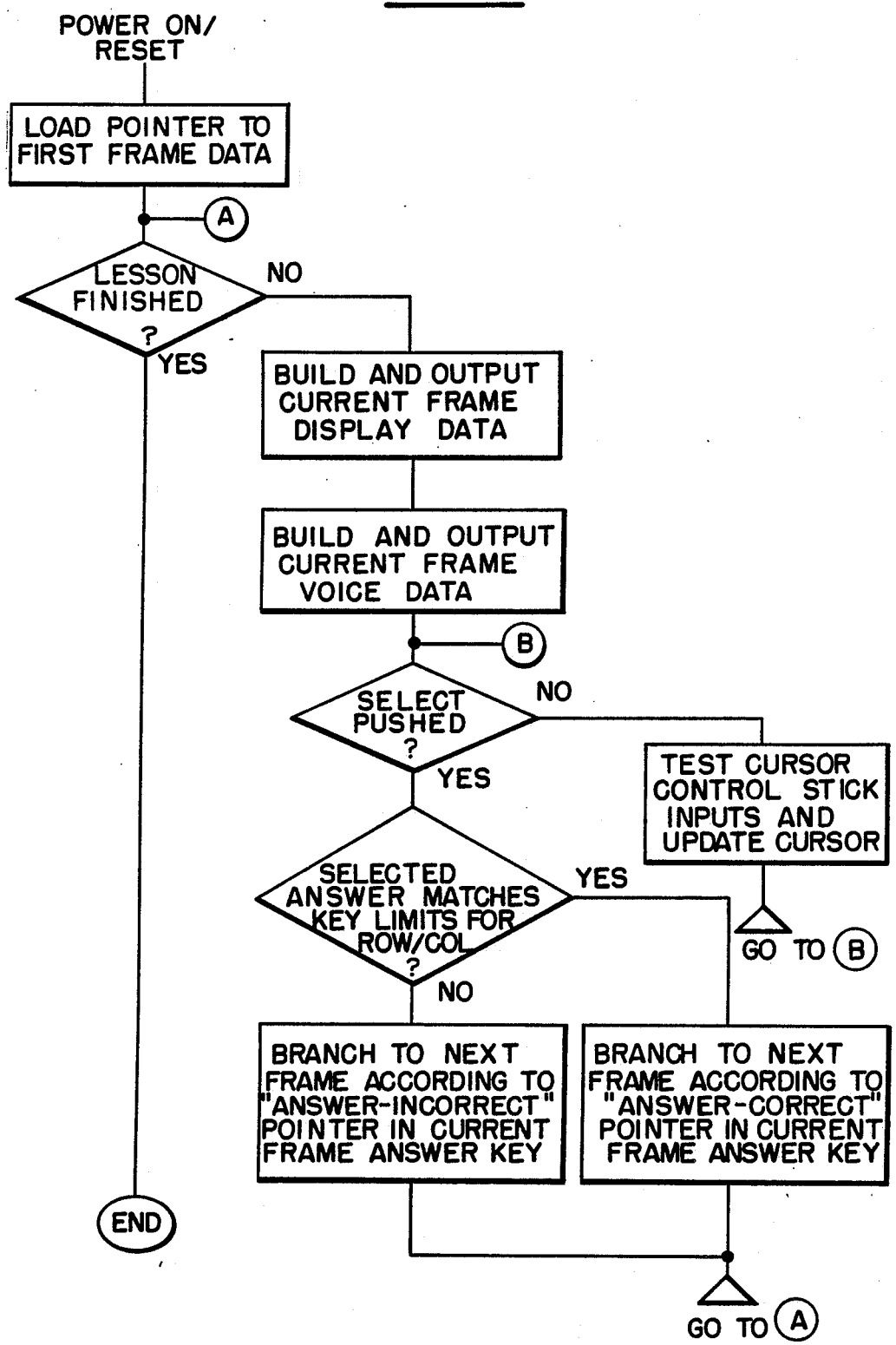
FIG. 6 is a high level flow chart providing additional detail of the operation of the system's software.

Referring now to FIG. 6, a high level flow diagram of the algorithm employed to implement the courseware is illustrated. The system initially loads a pointer to the first lesson frame data and then builds and outputs the lesson frame's display and voice data. Then, the system continuously tests the select input and the cursor controls to determine the users response and to reposition the cursor. When the select button is depressed, the algorithm determines whether the selected answer matches the row and column limits for the proper answer and if the answer is yes, it branches to the next frame in accordance with the "answer correct" pointer in the current frame which points to the location of the next frame's data in memory. If, on the other hand, an incorrect answer is inputted from the user, the system branches to an "answer incorrect" frame in accordance with the answer incorrect pointer in the current lesson frame. These functions repeat until there are no further lesson frames to be implemented, at which point the algorithm is at an end.

It is to be understood that the above described invention is illustrative only and that modification throughout may occur to those skilled in the art. For instance, while separate memory segments (e.g. ROM 54 and RAM 56) have been referred to herein, their functions may be accomplished by a single memory entity which has one portion allocated to ROM functions and another to RAM functions.

I claim:

1. A limited function, user friendly interactive teaching apparatus, the combination comprising:
    memory means for storing a first compilation of data corresponding to words and phrases to be used by the teaching apparatus and a pedagogical program comprised of a plurality of identically formatted, limited size, program units, each said program unit including screen display locations for said words and phrases to be displayed, a pointer to said first compilation of data for each word and phrase to be displayed, row and column delimiters indicating boundaries for a correct user answer and branch to addresses of subsequent program units;
    a display for displaying said words and phrases, said display further provided with a position indicator;
    processor means for executing said pedagogical program, program unit by program unit, said processor means fetching said words and phrases from said first compilation of data and exhibiting them on said display in accordance with said screen display locations; and
    x-y movement means for causing said position indicator to move on said display.

2. The invention as defined in claim 1 wherein said memory means additionally stores data corresponding to phonemes to be used with at least one of said words and phrases by said teaching apparatus; and further comprising: speaker means for audibly providing said phonemes to a user upon the display of said one of said words and phrases.

3. The invention as defined in claim 1 wherein said position indicator is a cursor and said x-y movement means is a joystick for providing direction input in only the x and y directions, and further includes a selector input means for providing an indication to said processor means when said cursor is at a desired point on said display, the joystick and selector input means being the sole user inputs to the teaching apparatus during operation.

4. The invention as defined in claim 1 wherein each said program unit further includes a memory voice point for phoneme strings to be broadcast with said words and phrases and speaker means for broadcasting said phoneme strings.

5. The invention as defined in claim 4 wherein said processor means fetches phoneme strings from said first compilation of data under control of pointers in said program unit, and assembles said phoneme strings into groups to comprise human-intelligible words and phrases for broadcast by said speaker means.

6. The invention as defined in claim 1 wherein each of said program units has an identical number of data fields, each said data field has a length which is variable within predetermined limits, each said data field having a boundary identified by a designated delimiter symbol.

7. The invention as defined in claim 1 wherein said words and phrases are stored with predetermined starting locations in said memory means and have ending boundaries defined by designated delimiter symbols.

8. The invention as defined in claim 1 wherein said position indicator is a touch sensitive means associated with said display, for producing x and y position signals to said processor means.

9. The invention as defined in claim 1 wherein said position indicator is comprised of a plurality of depressible buttons arranged about said display for producing position signals to said processor means.

10. The invention defined in claim 1 wherein each said program unit has a predetermined starting location in said memory means and has an ending boundary defined by a designated delimiter symbol.

* * * * *